Figure 1:
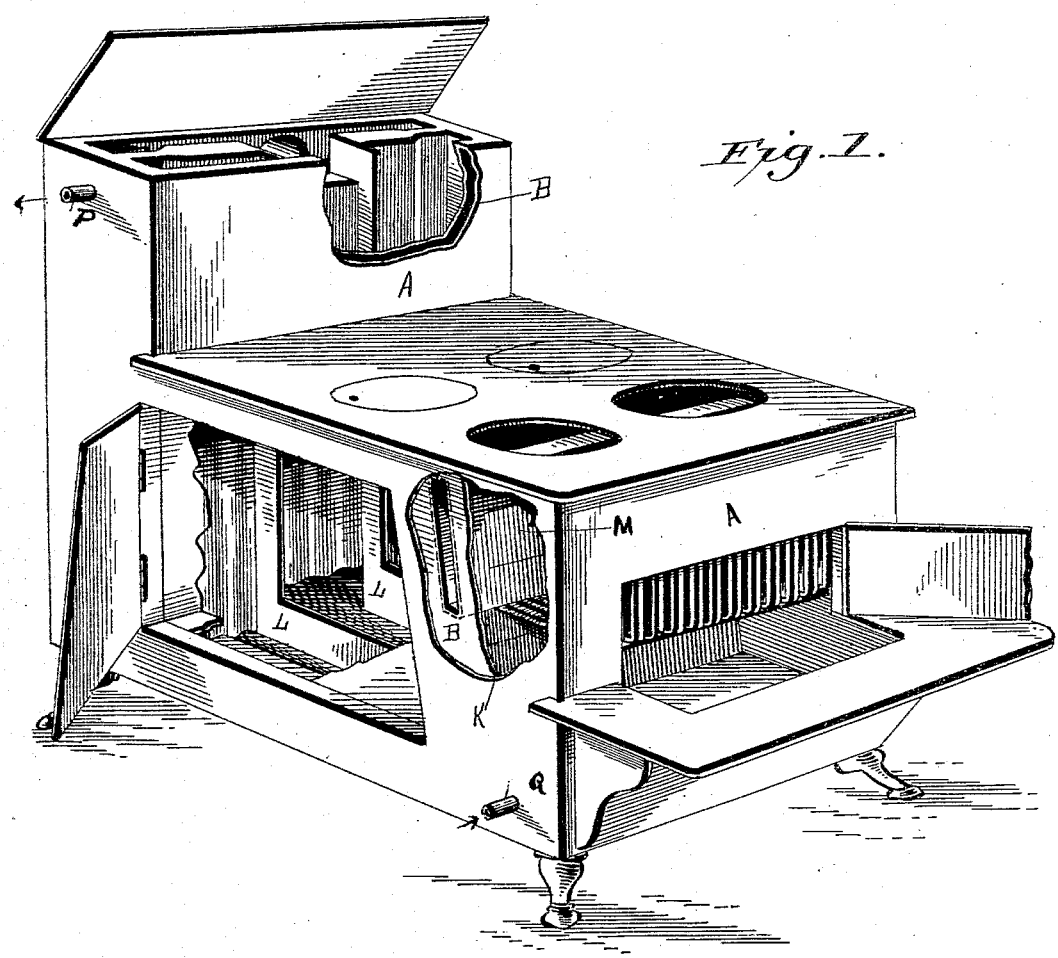
Figure 2:
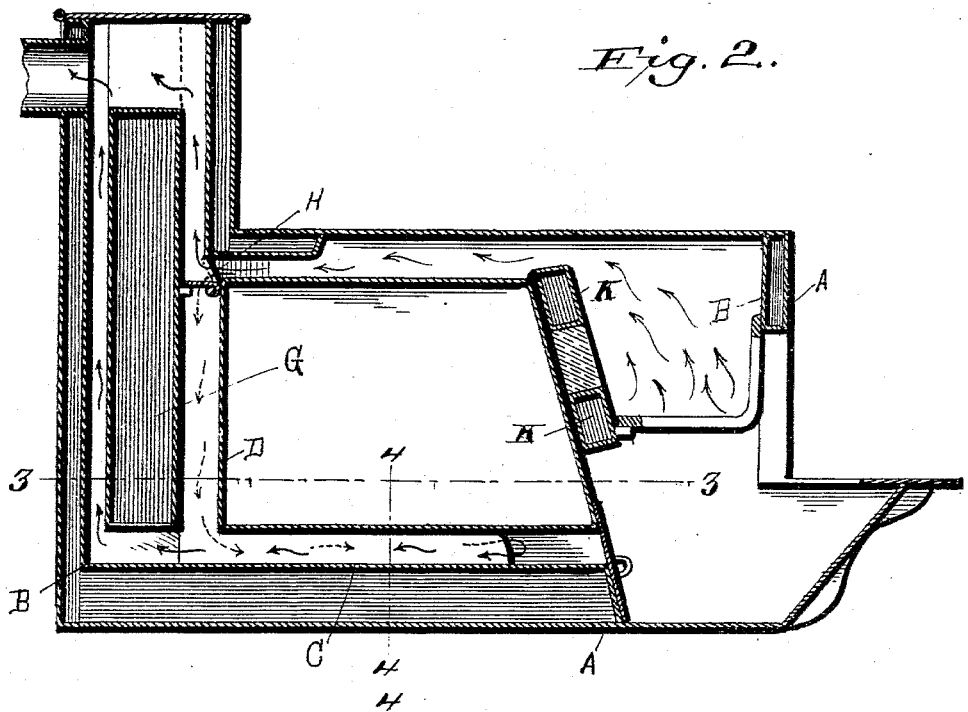
Figure 3:
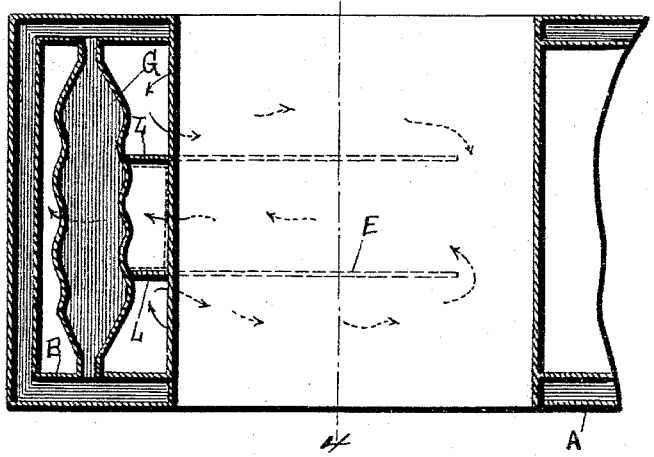
Figure 4:
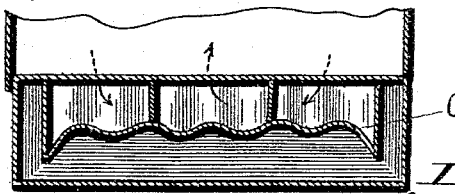

(No Model.)  2 Sheets—Sheet 1.
J. A. WAGLE.
WATER HEATING STOVE.

No. 546,367. Patented Sept. 17, 1895.

Witnesses:
L. C. Hills.
A. L. Hough

Inventor:
John A. Wagle,
by Franklin H. Hough
Atty.

(No Model.) 2 Sheets—Sheet 2.

J. A. WAGLE.
WATER HEATING STOVE.

No. 546,367. Patented Sept. 17, 1895.

Witnesses:
L. C. Hills
A. L. Hough

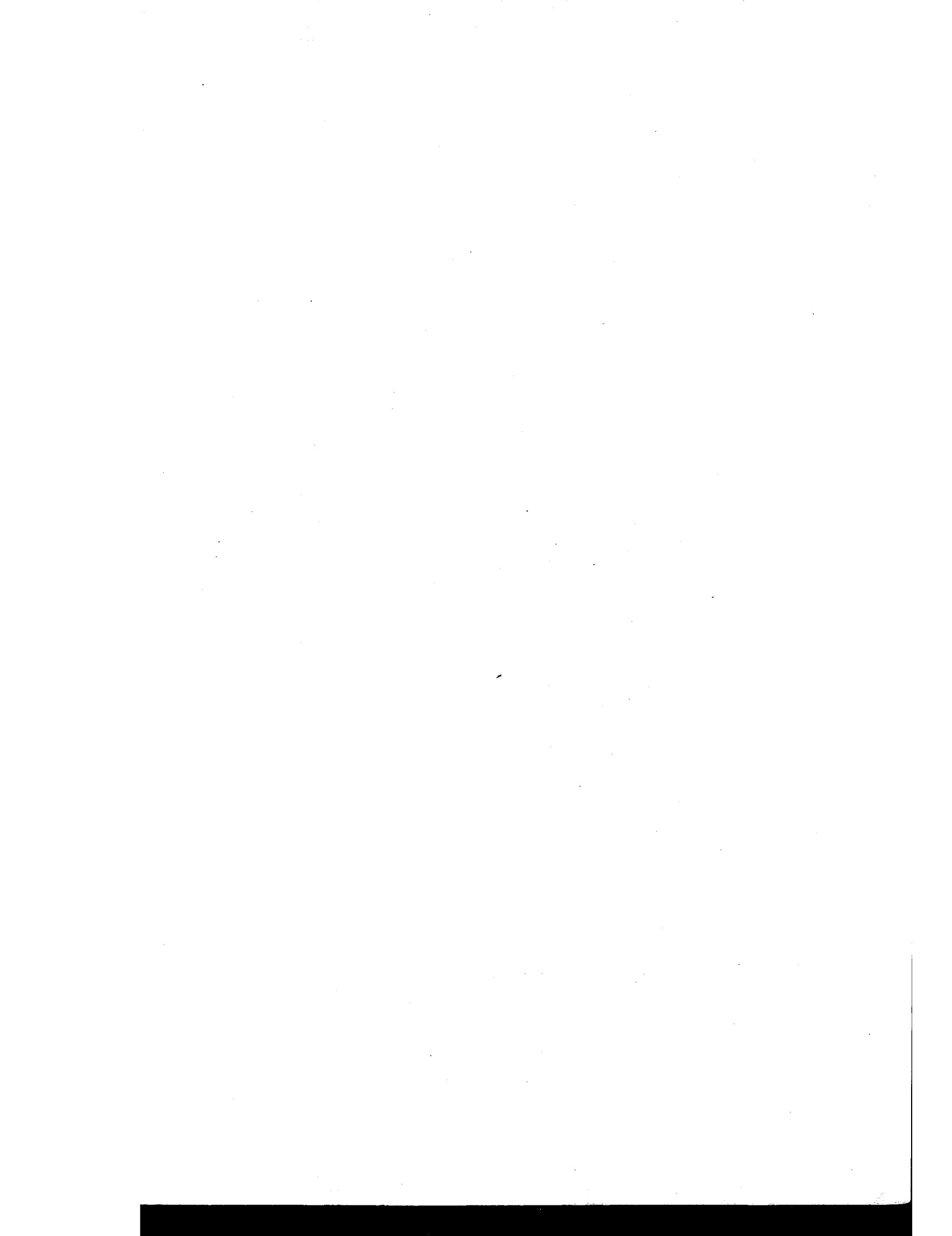

Inventor:
John A. Wagle,
by Franklin H. Hough
Atty.